United States Patent Office 3,592,621
Patented July 13, 1971

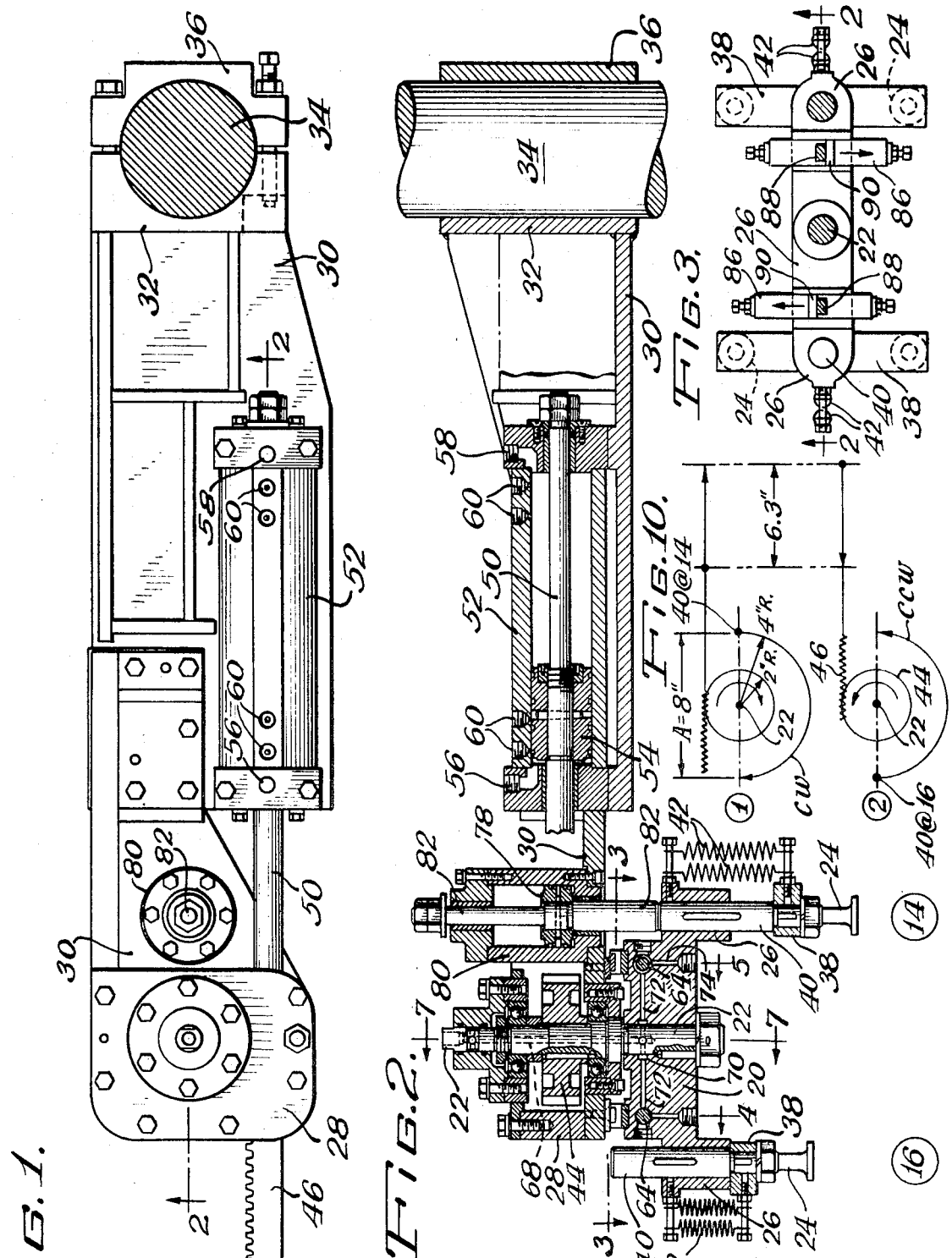

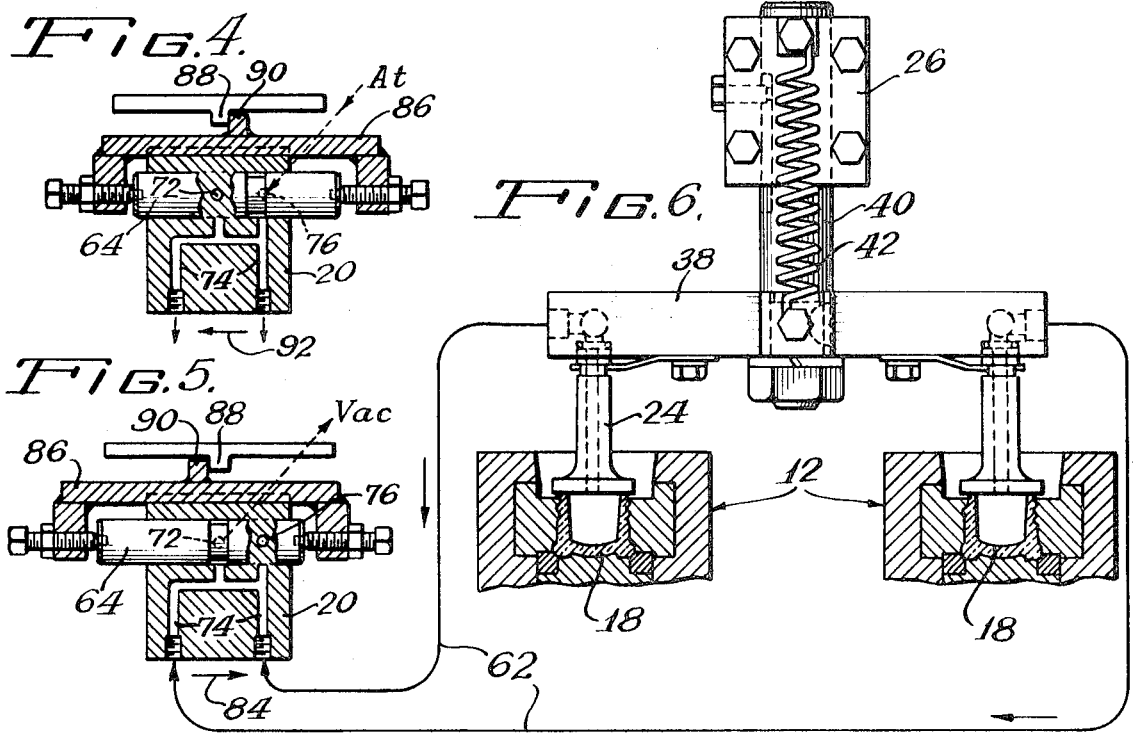
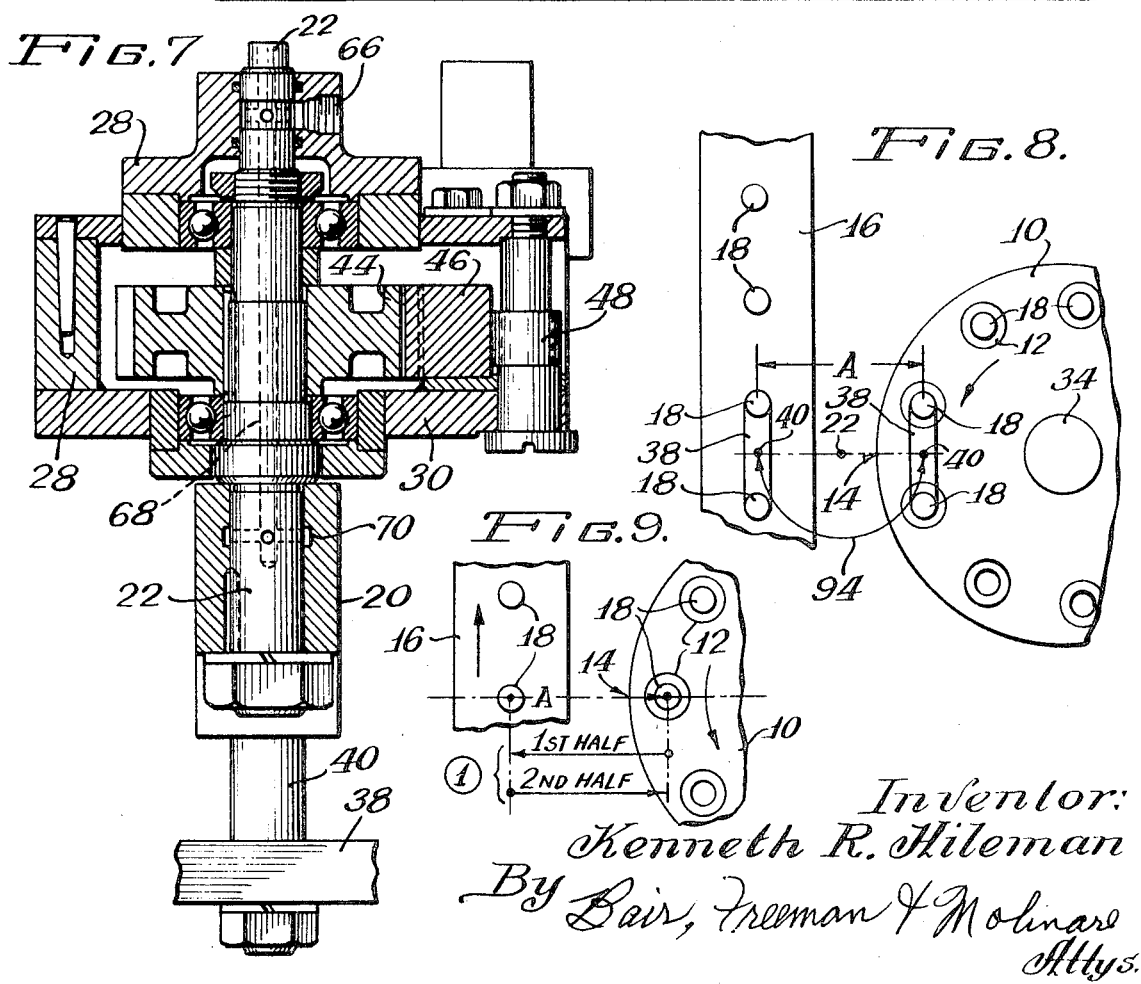

3,592,621
VACUUM TAKE-OUT ASSEMBLY FOR GLASS MAKING APPARATUS
Kenneth R. Hileman, Anderson, Ind., assignor to Lynch Corporation, Anderson, Ind.
Filed Sept. 20, 1968, Ser. No. 761,108
Int. Cl. C03b 9/04
U.S. Cl. 65—260                6 Claims

ABSTRACT OF THE DISCLOSURE

A take-out assembly for glassware forming machines having an oscillatable cross arm, each end of the cross arm carrying an engaging and supporting means for a molded article and operable to remove the molded article from a mold of a mold carrier member, oscillate 180°, and deposit the article on a take-away conveyor. By providing an engaging and supporting means for each end of the cross arm, in one take-out cycle one end of the arm is operable to remove a molded article from a mold while at the same time the other end is operable to deposit a molded article on the take-away conveyor. Fluid pressure operated means in the form a cylinder, piston therein, and a rack and pinion connection with a shaft for the cross arm, oscillates the cross arm with a shorter stroke and accordingly less momentum and inertia than the usual type of reciprocating take-out arrangement. Means is provided at the take-out station for lowering the molded article engaging and supporting member relative to the cross arm and into engagement with the molded article, and then lifting the article out of the mold. The article engaging and supporting members are of the vacuum type, automatic vacuum valves being provided to communicate a source of vacuum with the engaging and supporting means when engaged with the molded article and while lifting it and transferring it to the take-away conveyor whereupon the vacuum is released from the engaging and supporting means to permit the article to be deposited on the take-away conveyor.

BACKGROUND OF THE INVENTION

Heretofore reciprocating type take-out assemblies for glassware forming machines have been provided as evidenced for example in Langner Pat. No. 2,268,075, and Hendricks Pat. No. 2,725,154. For high-speed production, reciprocating elements traveling over a distance necessary from take-out station to a take-away conveyor are prohibitive because of the forces of momentum and inertia. Accordingly any reduction in travel can be attended by an equivalent increase in production.

One object of the present invention is to provide a design of take-out assembly which reduces travel distances when compared to a straight-away or reciprocating type of take-out assembly moving between take-out station and a point of deposit on a take-away conveyor.

More specifically, an object is to provide an assembly of this general character particularly adapted for a Lynch model MDP (Machine Driven Press). Such a press is suitable for molding electrical fuse bodies for instance, as illustrated in the patent drawings. Take-out elements are provided in the form of molded articles engaging and supporting members of vacuum pick-up type.

Another object is to provide pick-up elements mounted on opposite ends of an oscillatable cross arm and to oscillate the cross arm by means of a rack and pinion wherein the rack terminates in a piston within a cylinder so that the cross arm and thereby the vacuum pick-up elements can be oscillated at 180° in one direction during one cycle of take-out of the glassware forming machine, and can be oscillated 180° in the opposite direction during the next take-out cycle thereof.

Still another object is to provide means for controlling the communication of the pick-up elements with a source of vacuum for pick-up and holding purposes until the molded article is in position to be released onto a take-away conveyor or the like.

A further object is to provide means for depressing the pick-up element into engagement with the molded article at the take-out station, and then to retract the pick-up element for lifting the article whereupon it is moved by oscillation of the cross arm to the take-away conveyor and released thereon.

Still a further object is to provide vacuum valves for controlling and timing the pick-up elements with respect to the molded articles in the form of slide valves carried by the cross arm and automatically actuated by stops at the take-out and take-away conveyor stations by reason of engagement with the stops when arriving at the two stations mentioned, causing vacuum communication at the take-out station and cessation of such communication at the take-away conveyor.

BRIEF SUMMARY OF THE INVENTION

A support is provided which is clamped to a shaft for the mold carrying table of a glassware forming machine and extends radially therefrom to a position over the take-out station and over a take-away conveyor. An oscillating shaft is journalled on the support between the take-out station and the take-away conveyor and is oscillated by reason of a pinion thereon meshing with a rack which is fluid pressure reciprocated. Molded article engaging and supporting elements of vacuum pick-up type are supported by the ends of the cross arm which is oscillated 180° in one direction during a take-out cycle of the glassware forming machine and 180° in the opposite direction during the next take-out cycle. The vacuum is automatically applied at the take-out station where means is provided to lift the molded article out of the mold, and the article is held by vacuum until it reaches the take-away conveyor whereupon the vacuum action ceases.

BRIEF DECRIPTION OF THE DRAWINGS

FIG. 1 is a plan view of a vacuum take-out assembly embodying my invention, but omitting a cross arm and vacuum pick-up elements carried thereby which are shown in FIG. 3.

FIG. 2 is a vertical sectional view on the line 2—2 of FIG. 1, and includes the cross arm and vacuum pick-up elements as taken on the line 2—2 of FIG. 3.

FIG. 3 is a plan view of the cross arm and vacuum pick-up elements together with associated mechanism and is taken on the line 3—3 of FIG. 2.

FIGS. 4 and 5 are enlarged vertical sectional views on the lines 4—4 and 5—5 respectively of FIG. 2 showing individual valves for two pairs of vacuum pick-up elements in different positions as assumed at the take-away conveyor and take-out station respectively of the glassware forming machine.

FIG. 6 is an enlarged elevation showing a pair of vacuum pick-up elements (the right hand pair in FIGS. 2 and 3) and shows diagrammatically fluid pressure lines connecting these elements to the adjacent valve element shown in FIG. 5.

FIG. 7 is an enlarged vertical sectional view on the line 7—7 of FIG. 2 showing cross arm, cross arm shaft, pinion and rack mechanism of the take-out assembly.

FIG. 8 is a diagrammatic plan view to described the take-out operation;

FIG. 9 is a similar diagrammatic plan view for comparison purposes showing a prior staright-line take-out arrangement and its operation in one take-out cycle of the glassware forming machine, over which the present invention is an improvement; and FIG. 10 is a diagram of the present assembly in comparison with FIG. 9 to show take-out operations in each of two take-out cycles of the glassware forming machine.

DESCRIPTION OF THE PREFERRED EMBODIMENT

On the accompanying drawings, I have used the reference numeral 10 to indicate a mold carrier member such as an intermittently rotating 9-mold table of an MDP model glassware forming machine and 12, the molds carried thereby (FIGS. 8 and 9 only). A take-out station of the table is indicated by the arrow 14. Molded articles 18 ars shown in the upper four molds 12 of FIG. 8 and the upper two of FIG. 9, and on the take-away conevyor 16. In FIG. 6 the molds are shown generally at 12 and are of the split type which can be opened for release of the molded articles 18 which as shown in FIG. 6 are fuse bodies.

In general, the mechanism of my vacuum take-out assembly includes a cross arm 20 carried by a vertical oscillatable shaft 22, and at each end of the cross arm a pair of article engaging and supporting elements of the vacuum take-out type are shown at 24. The shaft 22 is journalled in a housing 28 as shown in FIGS. 2 and 7 which is carried by an arm-like support 30 terminating in a seat 32 for one side of a vertical shaft 34 which is the center shaft for the table 10 as shown in FIG. 8. A clamp cap 36 is provided for cooperation with the seat 32 to rigidly clamp the supporting arm 30 with respect to the shaft 34 and to hold the arm in a fixed position with the vertical oscillatable shaft 22 centered on the center line of the take-out station 14.

The article engaging and supporting elements 24 as shown in FIG. 6 are removably carried by secondary cross arms 38 and these cross arms in turn are carried by vertical sliding shafts 40 mounted in slide bearings 26 at the outer ends of the cross arm 20. The shafts 40 and thereby the cross arms 38 and the vacuum pick-up elements 24 are biased upwardly by springs 42 as shown in FIGS. 2, 3 and 6.

Means is provided for oscillating the vertical shaft 22 and thereby the cross arm 20, 180° at a time, first in one direction and then in the other. Such means is in the form of a pinion 44 with which a rack 46 meshes, the rack being backed up by a roller 48 as shown in FIG. 7. The rack terminates in a piston rod 50 (see FIG. 1) and the piston rod enters a cylinder 52 (see FIG. 2) and is provided therein with a piston 54 whereby the piston rod and the rack may be oscillated by the alternate introduction of fluid pressure into connections 56 and 58 shown in FIG. 2. Additional connections 60 are shown for the use of the usual cushioning valves to permit maximum speed of piston travel but cushioning thereof at the ends of the strokes in a manner well known in the art.

As shown dotted in FIG. 6, the vacuum pickup elements 24 are hollow, and vacuum connections 64 communicate therewith and with slide valves 64 as shown in FIGS. 5 and 6. These slide valves communicate with a source of vacuum supplied to a vacuum port 66 and a passageway 68 along the center of the shaft 22, then with a circular port 70 in the cross arm 20 and passageways 72 of the cross arm leading to the slide valves 64. The valve action is obvious in FIG. 5 where a circular groove in the slide valve communicates with the passageways 74 which in turn communicate with the vacuum connections 62.

When the valve is shifted in the opposite direction as in FIG. 4, the passageways 74 no longer communicate with the passageways 72 but with a vent 76 from atmosphere. The vent from atmosphere is diagrammatically designated in FIG. 4 "At" and communication with a source of vacuum is likewise designated in FIG. 5 "Vac."

In FIG. 2 the take-out station 14 is designated within a circle and likewise the take-away conveyor station 16, which circles are aligned with the right hand and left hand vertically slidable shafts 40 respectively. At the take-out station 14, a fluid operated piston 78 is slidable vertically in a cylinder 80 carried by the supporting arm 30. A piston rod 82 extends downwardly therefrom and in alignment with the shaft 40 at the take-out station, and may be depressed by the supply of fluid pressure in the cylinder above the piston as in FIG. 2 for the purpose of the piston rod 82 engaging the shaft 40 at this station and depressing it against the bias of the springs 42 as shown, the left hand shaft 40 being shown in the raised position due to the contraction of the springs.

When depressed in the manner just described, the lower surfaces of the vacuum pick-up elements 24 engage the molded articles (such as the fuse bodies 18 as shown in FIG. 6) under whatever pressure is introduced into the cylinder 80 above the piston minus the tension of the expanded springs 42, thus insuring a firm surface-to-surface contact for vacuum pick-up purposes. Just prior to this operation the cross arm 20, which was moving in the direction of the arrow 84 in FIG. 5, caused the slide valve 64 carried thereby to assume the vacuum producing position illustrated due to a slide plate 86 having been stopped by stop 88 engaged by a projection 90 from the slide plate. The arrow 84 represents oscillation of the cross arm 20 in one direction.

The next operation that takes place is for the pressure to be relieved above the piston 78 so that the springs 42 at the take-out station can contract and thereby lift the vacuum pick-up elements 24 and their load of fuse bodies 18, the molds 12 having been previously opened to permit removal of the molded articles. Next the cross arm 20 is oscillated in the opposite direction (which would be according to the arrow 92 in FIG. 4) and this slides the valve 64 to the opposite position to permit air to enter through the vent 76 from atmosphere and flow into the vacuum pick-up elements 24 and the fuse bodies 18 to release them so that they drop (usually a small fraction of an inch) onto the take-away conveyor 16. The stops 88 are stationary since they are carried by the arm 30 as shown in FIG. 2.

Two take-out elements 24 are illustrated so as to pick up fuse bodies from two molds 12 at one time and accordingly the table 10 is advanced the equivalent of two molds each take-out cycle. Referring to FIG. 8, the oscillations of the take-out assembly are illustrated by a double headed curved arrow. Compared to a conventional take-out arrangement, FIG. 9 shows an arrow A for straight line take-out. This arrow A is the same dimension as the arrow A in FIG. 8. With a take-out of the straight line type the take-out head must travel toward the left according to the arrow "1st Half" shown in FIG. 9 and in the reverse direction during the second half of the take-out cycle as indicated "2nd Half," one complete cycle being indicated as (1). Assuming the dimension A is 8" as shown in FIG. 10, this means there must be an 8 inch stroke in one direction and an 8 inch stroke in the opposite direction each take-out cycle.

In FIG. 10 the first take-out cycle is indicated (1) and the second take-out cycle is indicated (2). Assuming further that the pinion 44 has a 2" radius and that the shafts 40 have a 4" radius of swing, the total movement from take-out station to take-away conveyor is 8" the same as in FIG. 9. However, the travel of the rack is only 6.3" (rounding out $\pi$ to the value of 3.15) so that only a 6.3 inch stroke of the piston is necessary per take-out cycle as it travels in only one direction in cycle (1) and in the opposite direction in cycle (2). On the other hand the travel per cycle must be 8" out and 8" back, or a total of 16" in the example shown in FIG. 9. Thus the forces of momentum and inertia are reduced in a design of the character herein disclosed and higher speed production is thereby possible.

I claim as my invention:

1. A system for taking glassware from a glass forming machine and depositing the same on a take-out conveyor, said system comprising, in combination, a mold carrier member on said machine for supporting formed glassware, a take-out conveyor laterally spaced from said carrier member, a support arm mounted on said machine and extending toward said conveyor, an upright shaft rotatably mounted on said support arm at a position intermediate said conveyor and said carrier member, a cross arm connected at its central portion to the low end of said upright shaft, take-out members on each end of said cross arm for engaging and supporting glassware from the time said glassware is picked up from said carrier member until the time said glassware is deposited on said conveyor, and means for rotating said shaft and thereby said cross-arm 180° in one direction to transfer a piece of said glassware supported on a take-out member at one end of said cross arm from a position over said carrier member to a position over said take-out conveyor while the take-out member at the other end of said cross arm is moved from a position over said conveyor to a position over said carrier member and for thereafter rotating said shaft and thereby said cross arm 180° in an opposite direction so that glassware supported by the take-out member at said other end of said cross arm is moved from a position over said carrier member to a position over said take-out conveyor.

2. A take-out assembly in accordance with claim 1 wherein said take-out members on each arm of said cross arm is a vacuum pickup element.

3. A take-out assembly in accordance with claim 1 wherein said means for rotating said cross arm includes a rack and pinion connection with said cross arm.

4. A take-out assembly in accordance with claim 1 wherein said means for rotating said cross arm is a reciprocable, fluid pressure operated element which has a rack and pinion connection with said cross arm.

5. A take-out assembly in accordance with claim 1 wherein means are provided for selectively lowering said take out member into engagement with the glassware and for then raising said take-out member for lifting the glassware from the carrier member.

6. A take-out assembly in accordance with claim 1 wherein said take-out members are each carried by a slidable element, means are provided for biasing said slidable element upwardly, and fluid pressure operated means are provided for engaging said slidable element and lowering it against the biasing means and for thereafter releasing the fluid pressure to permit the biasing means to raise said take-out members.

References Cited
UNITED STATES PATENTS

| | | | |
|---|---|---|---|
| 2,725,154 | 11/1955 | Hendricks | 214—658 |
| 2,890,077 | 6/1959 | Littell | 214—1BS |
| 3,195,996 | 7/1965 | Tigley | 65—260X |
| 3,210,172 | 10/1965 | Eldred | 65—260X |

S. LEON BASHORE, Primary Examiner

R. L. LINDSAY, Jr., Assistant Examiner

U.S. Cl. X.R.

214—1, 658